A. BUQUET.
COMPUTING SCALE.
APPLICATION FILED JAN. 18, 1917.
1,233,179.
Patented July 10, 1917.
2 SHEETS—SHEET 1.
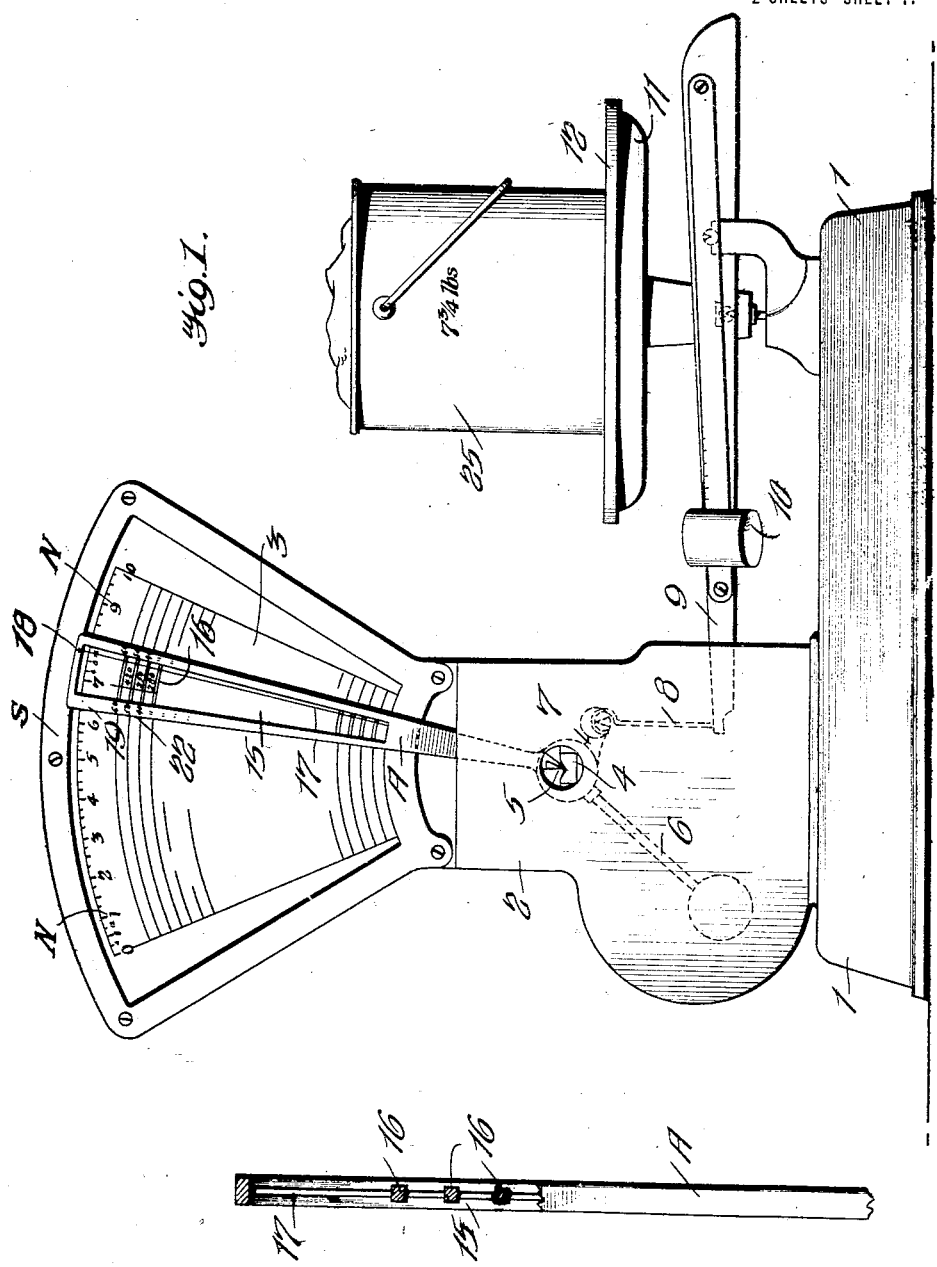
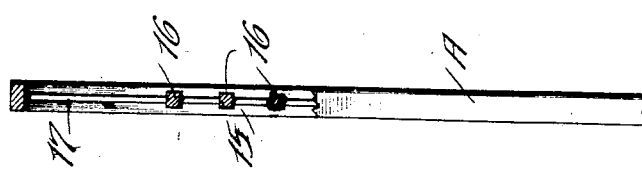
WITNESSES
INVENTOR
AUBIN BUQUET,
BY
ATTORNEYS A. BUQUET.
COMPUTING SCALE.
APPLICATION FILED JAN. 18, 1917.
1,233,179.
Patented July 10, 1917.
2 SHEETS—SHEET 2.
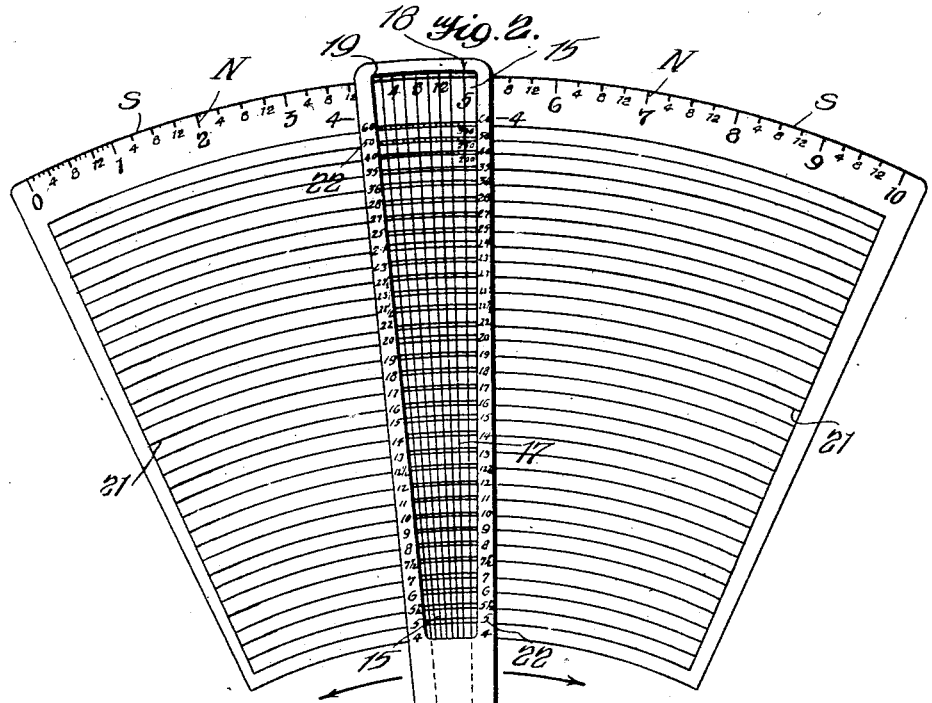
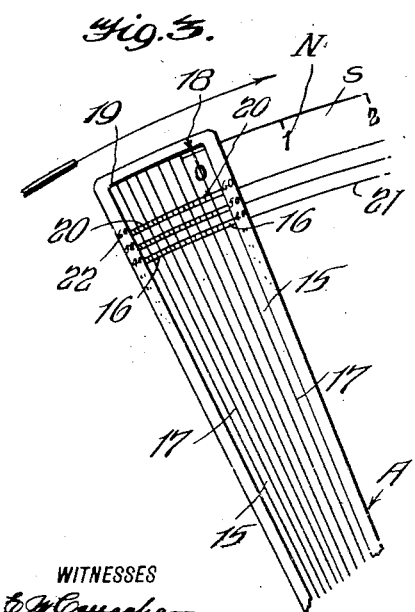
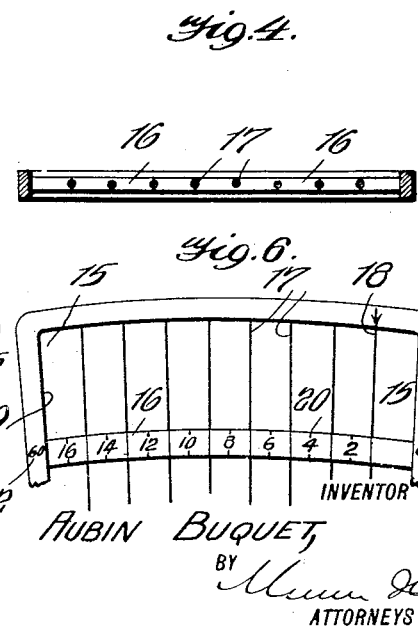
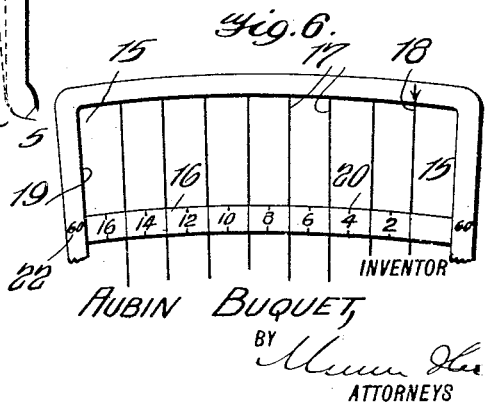
WITNESSES
INVENTOR
AUBIN BUQUET,
BY
ATTORNEYS

UNITED STATES PATENT OFFICE.

AUBIN BUQUET, OF DULAC, LOUISIANA.

COMPUTING-SCALE.

1,233,179.  Specification of Letters Patent.  Patented July 10, 1917.

Application filed January 18, 1917. Serial No. 143,030.

*To all whom it may concern:*

Be it known that I, AUBIN BUQUET, a citizen of the United States, and a resident of Dulac, in the parish of Terrebonne and State of Louisiana, have invented a certain new and useful Improvement in Computing-Scales, of which the following is a specification.

My invention relates to improvements in computing scales, and it consists in the combinations, constructions, and arrangements herein described and claimed.

An object of my invention is to provide an index arm or pointer by means of which the tare weight of a container is registered immediately when the container is placed on the scale pan, thereby obviating the necessity of shifting weights to balance the container in order to fill the container with a given net weight of a commodity.

A further object of my invention is to provide an indicating arm or pointer having a plurality of radially extending lines which render the reading of the scale much easier.

A further object of my invention is to provide a scale having an arm by means of which the tare weight may be registered, and by means of which the net weight may be indicated and the selling price instantly observed.

Other objects and advantages will appear in the following specification, and the novel features of the invention will be particularly pointed out in the appended claims.

My invention is illustrated in the accompanying drawings forming part of this application, in which:

Figure 1 is a face view of a scale having my improved arm embodied therein;

Fig. 2 is a detail view of the arm and a portion of the scale dial;

Fig. 3 is a view of a portion of the dial showing the arm in its normal position;

Fig. 4 is an enlarged section along the line 4—4 of Fig. 3,

Fig. 5 is a longitudinal section along the line 5—5 of Fig. 3, and

Fig. 6 is an enlarged detail view of the upper part of the indicating arm.

In carrying out my invention, I may make use of any of a number of forms of computing scales, of the type in which a pivoted arm swings over an arc-shaped dial, the dial being provided with a series of concentric arcs, and the arm being provided with numerals corresponding to the arcs, the dial also being provided with radial lines adjacent to said concentric arcs with numerals corresponding to said radial lines. These dials have a row of numerals at the top or bottom indicating the weight in pounds.

In Fig. 1 I have shown a scale of the type described, which comprises a base 1, a housing 2 supported thereby, 3 a dial or chart within the housing, a fulcrum or support 4 for the knife edge 5 of the pendulum 6. The arm which I have denoted in general by A is rigidly secured to the pendulum 6 so as to swing with it. An arm 7 is engaged by a link 8 carried by the scale beam 9. A slidable weight is shown at 10, while the platform and scale pan are shown at 11 and 12 respectively.

With the exception of the specific form of the arm A, the rest of the apparatus is old, except in so far as it coöperates with this form of arm to produce a new result.

The arm A, as will be observed from the drawing, is wider at its outer end than at its inner end. It is provided with an opening 15, whose side edges are radially disposed with respect to the pivot point 5, and whose outer and inner edges are arcs whose center is also the point 5. Extending transversely across the opening 15 is a series of cross bars 16, these cross bars being preferably formed in arc-shape, the centers of the arcs being the pivot point 5. Arranged to extend longitudinally with respect to the arm A and across the opening 15, are fine wires or strings 17, which may pass through the cross bars 16, as shown in Fig. 5, or may be attached to them in any suitable manner. These fine, hairlike strands are spaced equal distances apart. It will be noted that there are eight of these strands, and that the strand at the extreme right in Figs. 1, 2, and 3, has an indicating mark adjacent to it on the arm, this mark being shown at 18. The distance between this mark 18 and the side 19 of the opening 15 is the same as the distance between the large numerals N which indicate pounds on the scale S of the dial 3. In the present instance, the distance between adjacent hairlike strands corresponds to two ounces on the scale S.

It will be observed that the cross bars 16 have numerals 2, 4, 6, etc., indicating two ounces, and also division marks 20, which subdivide the space between adjacent strands 17 into divisions which represent one ounce on the scale S. On the side edges of the arm A are numerals denoting prices, these numerals corresponding to the series of concentric lines 21 on the dial 3.

In Fig. 2 at 22 I have shown numerals which denote the products of the weight and selling price, in other words, the total cost of the article to the buyer. Since these numerals are well known, I have only indicated a few of them in the drawing. The whole dial, however, should be supplied with numerals which represent the products of the selling price per unit and the number of units or pounds.

From the foregoing description of the various parts of the device, the operation thereof may be readily understood.

Let us assume that a salesman wishes to sell seven pounds of a commodity in a container whose tare weight he does not know. The arm A of the scale, in its normal position, will take the position shown in Fig. 3, in which the registering mark 18 and the hair strand to the right will register with the zero mark on the scale S. The salesman first puts the container 25, see Fig. 1, on the scale pan 12, and this will move the arm A until a balance is attained. Now by noting the position of the registering mark 18 with respect to the scale S, the weight of the container in ounces may be read directly from the scale S. We will assume that the weight of the container is twelve ounces, or three-quarters of a pound. Knowing that the tare weight is three-quarters of a pound, the salesman now proceeds to fill the container until the indicating mark on the arm 18 registers seven and three-quarters pounds. The salesman now notes the hairlike strand which registers with the seven-pound mark on the scale S, and runs his eye down the strand until he comes to the selling price per pound, which we will assume is forty cents. This selling price is adjacent to one of the cross bars 16. The amount the customer is to be charged, to wit, $2.80, appears at the intersection of the cross bar and the hair strand which registers with the numeral 7 on the scale.

It will be observed that the tare weight of the container is given directly on the scale, without the necessity of counterbalancing the container. The hand A also gives the gross weight, so that the gross weight, the net weight, and the tare weight may be indicated during the weighing of the commodity.

I claim:—

1. A computing scale having a dial, a row of numerals on the dial indicating pounds, sub-dividing marks indicating ounces, concentric rows of numerals representing products of units of weights and price per pound, an arm arranged to play over the dial and the row of numerals, said arm having a plurality of lines radially disposed with respect to the pivotal point of the arm, said lines being spaced apart, and the numerals of the scale being visible between the lines, and a series of cross or transverse members adapted to register severally with said rows of numerals and arranged to intersect said radial lines.

2. A computing scale having a dial, a row of numerals on the dial indicating pounds, sub-dividing marks indicating ounces, concentric rows of numerals representing products of units of weights and price per pound, an arm arranged to play over the dial and the row of numerals, said arm having a plurality of lines radially disposed with respect to the pivotal point of the arm, said lines being spaced apart, and the numerals of the scale being visible between the lines, and a series of cross or transverse members adapted to register severally with said rows of numerals and arranged to intersect said radial lines, the distance between the outer extremities of the radial lines corresponding with the marks on the scale which represent ounces.

3. A computing scale having a dial, a row of numerals on the dial indicating pounds, sub-dividing marks indicating ounces, concentric rows of numerals representing products of units of weights and price per pound, an arm arranged to play over the dial and the row of numerals, said arm having a plurality of lines radially disposed with respect to the pivotal point of the arm, said lines being spaced apart, and the numerals of the scale being visible between the lines, a series of cross or transverse members adapted to register severally with said rows of numerals and arranged to intersect said radial lines, the distance between the outer extremities of the radial lines corresponding with the marks on the scale which represent ounces, and a series of numerals carried by the arm at the end of each of said transverse members for indicating unit selling prices.

4. In a computing scale having a row of numerals indicating pounds, and sub-divisions indicating ounces, concentric rows of numerals representing products of units of weights and price per pound, a pivoted arm having a viewing opening, a series of indicating lines disposed in radial relation with respect to the pivot of the arm, and arranged to cross the viewing opening, and a series of transverse indicating members adapted to register severally with said rows of numerals and arranged on concentric arcs and intersecting said radial lines.

5. In a computing scale having a row of numerals indicating pounds, and sub-divisions indicating ounces, concentric rows of numerals representing products of units of weights and price per pound, a pivoted arm having a viewing opening, a series of indicating lines disposed in radial relation with respect to the pivot of the arm, and arranged to cross the viewing opening, and a series of transverse indicating members adapted to register severally with said rows of numerals and arranged on concentric arcs and intersecting said radial lines, one of said radial lines having a corresponding indicating mark on the arm at the end of the opening.

6. In a computing scale having a row of numerals indicating pounds, and sub-divisions indicating ounces, concentric rows of numerals representing products of units of weights and price per pound, a pivoted arm having a viewing opening, a series of indicating lines disposed in radial relation with respect to the pivot of the arm, and arranged to cross the viewing opening, a series of transverse indicating members adapted to register severally with said rows of numerals and arranged on concentric arcs and intersecting said radial lines, one of said radial lines having a corresponding indicating mark on the arm at the end of the opening, and each of said crossed members being sub-divided by indicating marks between the radial lines.

7. In a computing scale having a row of numerals indicating pounds, and sub-divisions indicating ounces, concentric rows of numerals representing products of units of weights and price per pound, a pivoted arm having a viewing opening, a series of indicating lines disposed in radial relation with respect to the pivot of the arm, and arranged to cross the viewing opening, a series of transverse indicating members adapted to register severally with said rows of numerals and arranged on concentric arcs and intersecting said radial lines, one of said radial lines having a corresponding indicating mark on the arm at the end of the opening, and each of said crossed members being sub-divided by indicating marks between the radial lines, said indicating marks on the arm registering with the zero of the row of numerals indicating pounds when the device is in its normal position of rest.

AUBIN BUQUET.